Figure 1:
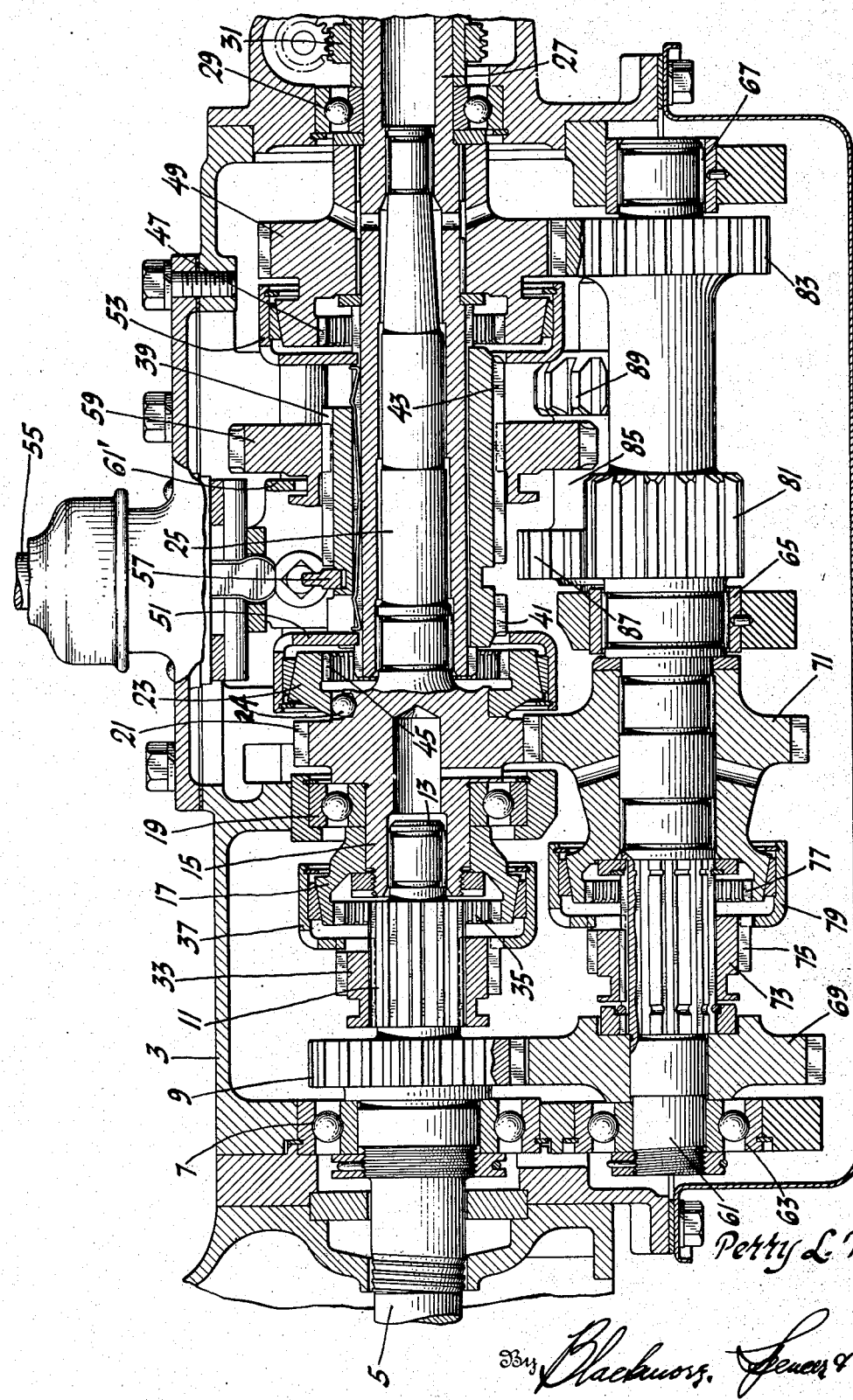

Oct. 19, 1937.    P. L. TENNEY    2,096,211
CHANGE SPEED GEARING
Filed Oct. 17, 1934    2 Sheets-Sheet 1

Inventor
Petty L. Tenney
By Blackmore, Seuer & Fluid
Attorneys

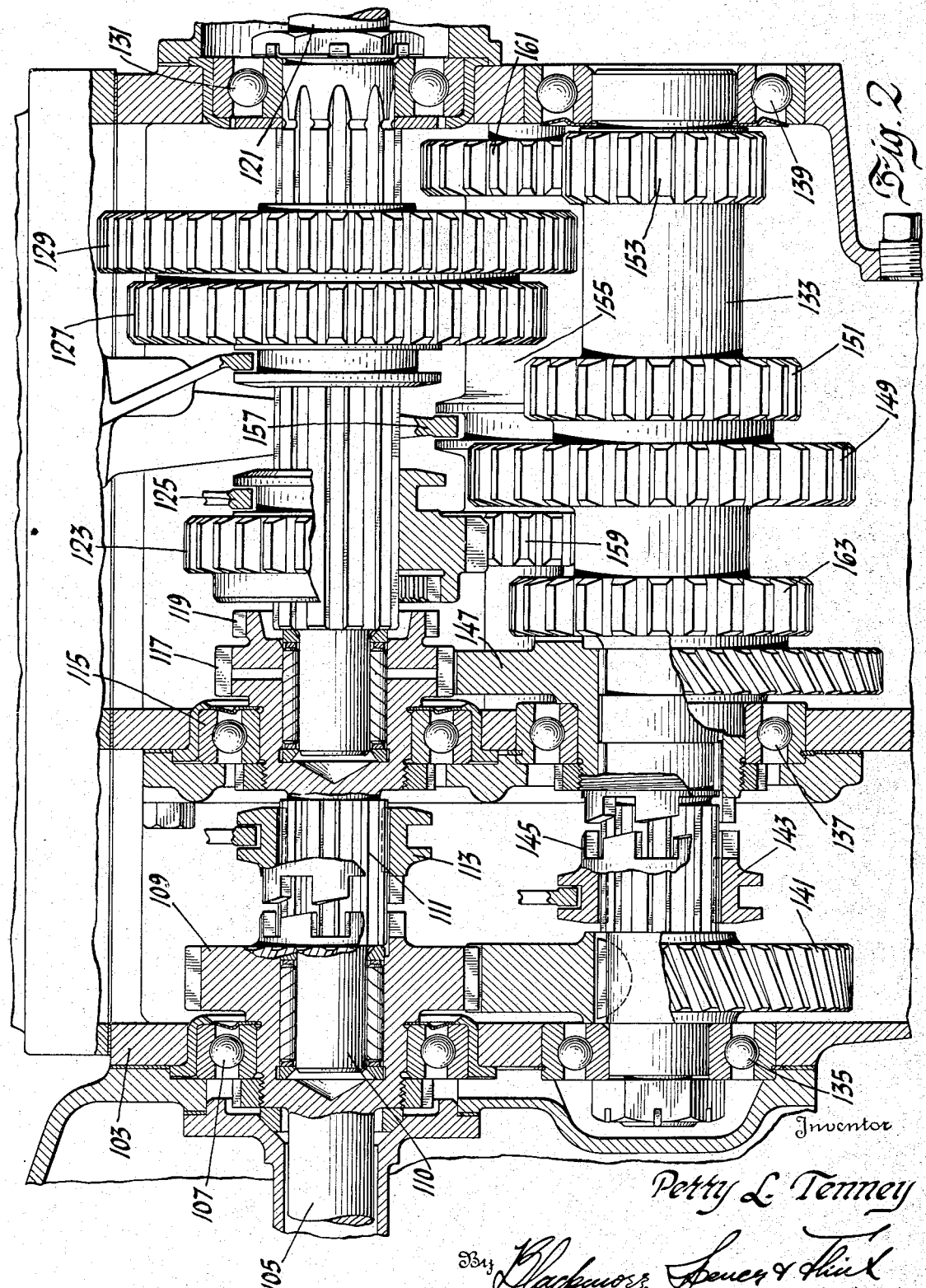

Patented Oct. 19, 1937

2,096,211

UNITED STATES PATENT OFFICE 2,096,211

CHANGE SPEED GEARING

Perry L. Tenney, Lansing, Mich., assignor to General Motors Corporation, Detroit, Mich., a corporation of Delaware Application October 17, 1934, Serial No. 748,569

2 Claims. (Cl. 74—338)

This invention relates to change speed transmission and is intended primarily for use on motor vehicles.

An object of the invention is to provide a two-speed driving arrangement in advance of a plural speed transmission so constructed that the same lower speed ratios are available regardless of which one of the two relatively high driving ratios is in operative position.

The invention will be understood by reference to the accompanying drawings in which Fig. 1 shows in vertical section one embodiment of the invention.

Fig. 2 shows also in section a second embodiment.

Referring by reference characters to the drawings and first to Fig. 1, numeral 3 represents a transmission housing entering which is an input shaft 5. This shaft may be the shaft driven by the engine through the clutch as is usual. It is rotatably supported by suitable bearings 7. Within the housing shaft 5 is provided with a gear 9, a splined portion 11, and a reduced end 13. An aligned shaft 15 surrounds the reduced end 13, carries a clutch 17, is supported in the housing at 19, carries a gear 21 adjacent the bearing, a clutch 23 adjacent the gear and held from rotation by suitable means 24, and has an elongated reduced end 25. The output shaft 27 is tubular, surrounds the reduced end 25 of shaft 15, is supported thereby and by a bearing 29, and is provided with a speedometer drive pinion 31.

Slidable on splines 11 of shaft 5 is a jaw clutch 33 adapted to engage teeth 35 of clutch 17. Associated with clutch 17 is an axially movable synchronizing clutch member 37 mounted non-rotatably relative to clutch 33. Reciprocation of clutch 33 first moves clutch member 37 with itself to engage frictionally the surface of clutch 17 thus to effect synchronization. Thereafter part 33 moves relatively to 37 and its jaw teeth engage teeth 35 to positively drive shaft 15 from shaft 5. This clutch arrangement is a substantially conventional mechanism for synchronizing the shaft prior to jaw clutch engagement.

A slidable sleeve 39 is mounted non-rotatably on the output shaft 27. It has at its ends jaw teeth 41 and 43 adapted to engage teeth 45 of clutch 23 and teeth 47 on gear 49 respectively. Gear 49 is mounted loosely on output shaft 27. Associated with sleeve 39 are synchronizing cone clutches 51 and 53 cooperating with conical clutch faces on clutch 23 and gear 49 to effect synchronism prior to engagement of the jaw teeth in the customary manner. Suitable shifting means for reciprocating the sleeve is represented on the drawings by the hand lever 55 and the fork 57. No novelty is involved in this application for the details by which the movement of lever 55 effects the reciprocating movement of sleeve 39 and further description is believed to be unnecessary. Non-rotatably slidable on sleeve 39 is a gear 59 adapted to be reciprocated by a fork 61' also actuated by the shift lever 55.

A countershaft 61 is rotatably supported in the transmission casing at 63, 65, 67. It carries a fixed gear 69 in constant mesh with gear 9 of shaft 5. It also carries loosely mounted thereon a gear 71 in constant mesh with the above described gear 21. A sliding clutch 73 is non-rotatably mounted on shaft 61 and is operable to clutch gear 71 to the shaft by means of teeth 75 and 77, there being preferably employed a synchronizing clutch designated by numeral 79. Shaft 61 is provided with a fixed gear 81 adapted to be engaged by gear 59 when the latter is reciprocated. It also has a gear 83 fixed to the shaft and in constant mesh with gear 49 on the output shaft 27. There is also an idler shaft 85 provided with gears 87 and 89, gear 87 being engaged with gear 81 and gear 89 adapted to drive gear 59 when the latter is reciprocated into engagement therewith.

The shifting of clutches 33 and 73 may be made in any way desired with the understanding that the shifting means is independent of the means for shifting sleeve 39 and gear 59. These two clutches, 33 and 73, it should also be noted, are to be shifted simultaneously to move in opposite directions to the end that when one clutch is engaged the other is released. No specific means is illustrated for so moving the two clutches simultaneously, there being many examples for so moving two clutches on two shafts in the prior art. By this means shaft 15 may be driven directly from shaft 5, or it may be driven from shaft 5 through reduction gearing 9—69 and 71—21. Shaft 15 may be considered as comparable to the input shaft of a modified form of the conventional three-speed transmission. The modification consists, first, in an arrangement whereby the countershaft is driven by gearing 9—69 and not from shaft 15 and, second, in that shaft 15 may itself be driven with two top or relatively high speeds, one when clutch 33 is operative and a lower top speed when clutch 73 is in operation. To deliver the one or the other of these top speeds to the output shaft 27, sleeve 39 is reciprocated to clutch shaft 27 to shaft 15. For one of the lower speeds sleeve 39 may be moved to the right to clutch gear 49 to the output shaft. In this case the drive is from shaft 5 through gear train 9—69 to shaft 61, and from shaft 61 through gears 83 and 49 to shaft 27. In this driving arrangement it should be noted that shaft 15 may be rotated but not under load from either clutch 33 or 73. Similarly, regardless of which of the clutches 33 and 73 is in action to drive shaft 15, low speed is obtained from shaft 61 through gears 81 and 59. Reverse driving involves gear trains 81—87, and 89—59. Here again the drive in reverse is not effected by the rate of rotation imparted to intermediate shaft 15. It matters not whether it is driven directly from shaft 5 or indirectly through gearing 71 and 21.

The above described transmission provides predetermined ratios for low speed driving uneffected by the setting of the clutches for the two top speeds. By the use of clutch 73 the third speed through gears 71—21 may be used as the top speed or a fourth speed may be used when clutch 33 is in operative position. The low speed ratios may be used with the high speed clutches in either position, to the end of providing, as it were, two different three-speed transmissions alike in their lower speed ratios but having different top speed ratios, thereby rendering the transmission useful for different load and road conditions. If the direct drive through clutch 33 be described as an overdrive, it will be seen that for heavy loads or for steep grades the clutch 33 is available to afford a four-speed transmission with gradual steps in ratio up to overdrive. If, on the other hand, while the overdrive clutch is engaged it is further necessary to stop and start, the operator may drive through the lower ratios and directly to the overdrive without using the third speed if the load and road permit. When driving with a light load or on a level road it will be obvious that the acceleration in second speed may be easily carried to a point where the slightly broader step to over-gear instead of third speed may be made, thus avoiding the shifting of the high speed clutches.

In Fig. 2 there is shown a similar provision for a choice of two high speed ratios with a larger number of lower driving ratios. In this case there are provided three lower speeds operable with ratios independent of the setting of the high speed driving system. The two high speed ratios may be used in sequence or either one of the two high speed ratios may be employed to form a four-speed change speed system.

Referring to Fig. 2, numeral 105 is the input shaft deriving its rotation from the engine and its clutch as usual. It is supported in casing 103 by a bearing 107. It is provided with a fixed gear 109. Within the open end of shaft 105 is rotatably supported the end of intermediate shaft 110. This shaft has splines 111 for a sliding jaw clutch 113 having teeth to engage cooperating teeth on gear 109. Beyond the casing bearing 115 for shaft 110 there is a gear 117 provided with clutch teeth 119. The hollow end of shaft 110 rotatably supports an output shaft 121. Slidably and non-rotatably mounted on shaft 121 is a clutch gear element 123 adapted to be reciprocated by a fork 125. Also slidable and non-rotatably mounted on shaft 121 is a unit comprising two gears 127, 129. An end bearing 131 completes the support of shaft 121 in the casing. The countershaft 133 is mouted in the casing by bearings 135, 137, 139. This shaft has secured thereto a gear 141 in constant mesh with gear 109. Slidably splined to shaft 133 is a clutch 143 having jaw teeth 145 to engage the teeth of the hub of a gear 147 loosely mounted on the countershaft. Gear 147 is in constant mesh with gear 117 described above. The countershaft has a gear 149 adapted to be engaged by slidable gear 123. It also has gears 151 and 153 to be engaged by gears 127 and 129 respectively. An idler element 155 is slidable by means of a fork 157. It is provided with gears 159 and 161 to engage a countershaft gear 163 and gear 129 respectively for reverse driving.

In this embodiment of the invention clutches 113 and 143 are to be simultaneously moved, in this case in the same direction, to render the one or the other of the clutches operative. By so moving the clutches intermediate shaft 110 may be driven at two unlike speeds. The several low speed and reverse ratios are obtained by reciprocating the several countershaft gears and the reverse idler. The ratios they afford are always the same regardless of the rate of rotation at which shaft 110 is being driven by shaft 105, whether it be driven directly by means of clutch 113 or through reduction gear or by means of clutch 143. The operation and advantages of this form of the invention will be understood in view of the explanation given above in connection with the form shown by Fig. 1.

I claim:

1. In combination, aligned input, intermediate and output shafts, locking clutch means between said intermediate shaft and said input and output shafts, respectively, whereby the output shaft may be driven at input shaft speeds, a single parallel countershaft, constantly driving gearing between the input shaft and countershaft, and reduction gearing between the countershaft and output shaft together with gearing between the countershaft and intermediate shaft, means to render said last-named gearing active simultaneously with the release of the clutch between the input shaft and intermediate shaft, said last-named gearing being dimensioned to drive the intermediate shaft at a speed greater than the speed at which the output shaft is driven by the gearing between itself and the countershaft.

2. In combination, aligned input, intermediate and output shafts, a countershaft, constant mesh gearing between the input shaft and countershaft, releasable clutch means between said input shaft and intermediate shaft to effect a first and high speed drive of the intermediate shaft, optionally operable gearing between the countershaft and intermediate shaft for driving the intermediate shaft at an optionally high speed but unlike that of the input shaft, a shiftable clutch between the intermediate shaft and output shaft, optional operable reduction gearing between the countershaft and output shaft to provide a plurality of ratio drives therebetween whereby the output shaft may be driven at relatively low speeds through the said constant mesh gearing and the optionally operable reduction gearing between the countershaft and the output shaft when the shiftable clutch between the intermediate shaft and the output shaft is released and regardless at which of the two said speeds the intermediate shaft is being driven by the input shaft, the last mentioned clutch adapted to be engaged upon the release of said optionally operable reduction gearing between the countershaft and output shaft and thereupon operable to drive the output shaft at the speed of the intermediate shaft at whichever of the two said speeds the intermediate shaft may be being driven by the input shaft.

PERRY L. TENNEY.